(12) United States Patent
Gumaer

(10) Patent No.: US 12,193,118 B2
(45) Date of Patent: *Jan. 7, 2025

(54) PROGRAMMABLE SIGNAL GENERATOR AND RADIO CONTROLLER

(71) Applicant: Lennard A. Gumaer, Bloomfield Hills, MI (US)

(72) Inventor: Lennard A. Gumaer, Bloomfield Hills, MI (US)

(*) Notice: Subject to any disclaimer, the term of this patent is extended or adjusted under 35 U.S.C. 154(b) by 74 days.

This patent is subject to a terminal disclaimer.

(21) Appl. No.: 17/160,398

(22) Filed: Jan. 28, 2021

(65) Prior Publication Data
US 2021/0153297 A1    May 20, 2021

Related U.S. Application Data

(63) Continuation of application No. 16/384,740, filed on Apr. 15, 2019, now Pat. No. 10,939,503.
(Continued)

(51) Int. Cl.
*H04W 88/18* (2009.01)
*G08B 3/10* (2006.01)
(Continued)

(52) U.S. Cl.
CPC ........ *H04W 88/188* (2013.01); *G08B 3/1033* (2013.01); *G08B 3/1091* (2013.01);
(Continued)

(58) Field of Classification Search
CPC ............. H04W 88/188; H04W 84/027; H04W 52/0287; H04W 52/029; G08B 3/1033; G08B 3/1091; H04M 9/001; H04M 11/022
See application file for complete search history.

(56) References Cited

U.S. PATENT DOCUMENTS 2,322,884 A * 6/1943 Roetken ................ G10H 1/043
381/62
2,561,349 A * 7/1951 Earp ..................... G10H 3/186
984/367
(Continued)

FOREIGN PATENT DOCUMENTS

CN    203324325 U  * 12/2013
CN    104540616 B  *  8/2016  ......... B22D 11/1206

OTHER PUBLICATIONS

MSS, COM-4004 70 MHz (0.2-80 MHz) If Modulator, Issued May 19, 2009, MSS, p. 1 (Year: 2009).*

*Primary Examiner* — Mohamed Barakat
*Assistant Examiner* — Rufus C Point
(74) *Attorney, Agent, or Firm* — Dickinson Wright PLLC

(57) ABSTRACT

A programmable signal generator and radio controller for providing dispatch paging tone out frequencies to first responders and other selected areas. The signal generator is capable of performing tone-outs to various first responders and being cross compatible with prior and future evolutionary systems. The signal generator uses plain-text console interface and plain-text tone-out parameter definitions allowing programming without special software, apps, or Internet connectivity. The signal generator is capable of controlling operational functions of connected radio transceiver equipment including initiating and terminating RF transmission, selecting radio channel or frequency, and monitoring operational status of the transceiver. The signal generator is also capable of interactive communication with external third-party digital radio dispatch console systems via Ethernet network and TCP/IP protocol via an isolated network interoperability interface that implements a simple Application Program Interface (API).

40 Claims, 11 Drawing Sheets

Related U.S. Application Data

(60) Provisional application No. 62/657,360, filed on Apr. 13, 2018.

(51) Int. Cl.
  *H04M 9/00* (2006.01)
  *H04M 11/02* (2006.01)
  *H04W 84/02* (2009.01)

(52) U.S. Cl.
  CPC ......... *H04M 9/001* (2013.01); *H04M 11/022* (2013.01); *H04W 84/027* (2013.01)

(56) References Cited

U.S. PATENT DOCUMENTS

| | | | | |
|---|---|---|---|---|
| 2,697,745 A * | 12/1954 | Halstead | .................. | H04J 1/00 370/204 |
| 3,920,897 A * | 11/1975 | Grant | ..................... | H04L 27/10 327/295 |
| 3,930,209 A * | 12/1975 | Popick | ..................... | H04B 3/40 333/138 |
| 3,948,139 A * | 4/1976 | Melcher | .................. | G10H 1/02 84/706 |
| 4,618,997 A * | 10/1986 | Imazeki | ................ | H04B 1/405 455/76 |
| 4,835,721 A * | 5/1989 | Becker | .................. | G06F 1/0328 708/250 |
| 4,909,121 A * | 3/1990 | Usa | ........................ | G10H 7/008 84/622 |
| 5,288,940 A * | 2/1994 | Izumisawa | ............... | G10H 7/02 84/603 |
| 5,999,994 A * | 12/1999 | Wakeland | ............. | G06F 13/124 710/240 |
| 9,461,707 B1 * | 10/2016 | Virden | ................ | H04L 25/4902 |
| 10,939,503 B2 * | 3/2021 | Gumaer | ................ | H04M 1/405 |
| 2011/0299633 A1 * | 12/2011 | Mirzaei | ................ | H03D 7/1458 375/340 |
| 2012/0065617 A1 * | 3/2012 | Matsiev | ................ | A61M 5/142 73/61.61 |
| 2015/0243163 A1 * | 8/2015 | Shoemake | ....... | H04N 21/42203 367/197 |
| 2018/0154147 A1 * | 6/2018 | Izvorski | ................ | A61N 1/36034 |
| 2021/0153297 A1 * | 5/2021 | Gumaer | ............... | H04M 11/022 |

* cited by examiner

Figure 3

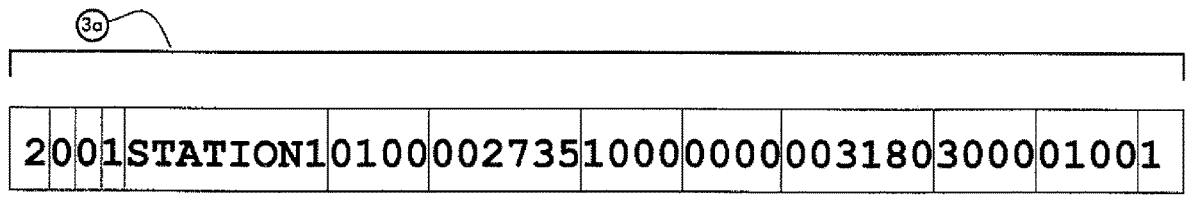

| "2" | Defines a two-tone sequence |
| "0" | Defines recipient attributes |
| "0" | Defines type attributes |
| "1" | Radio channel specifier |
| "STATION1" | Human-readable recipient name |
| "0100" | Prefix, in milliseconds |
| "002735" | Frequency 1, in Hertz (273.5Hz) |
| "1000" | Duration of Frequency 1, in milliseconds |
| "0000" | Suffix, in milliseconds (0, tones are continuous) |
| "003180" | Frequency 2, in Hertz (318.0Hz) |
| "3000" | Duration of Frequency 2, in milliseconds |
| "0100" | Suffix, in milliseconds |
| "1" | Repeat count integer |

Figure 4

```
$ M [Return]

Select recipient management action
(A)dd, (E)dit, (C)opy, (D)elete or e(X)it: A [Return]

Enter page number for new recipient (1-8): 1 [Return]
Enter button/key to use for new recipient (1-8): 2 [Return]

Configuring recipient 12. Press Ctrl-C or ESCape to abort...

Select recipient type
(0) Null, (1) SINGLE_TONE, (2) TWO_TONE, (3) DIALSTRING,
(4) MORSE, (5) COMPLEX: 2 [Return]

Select recipient attribute
(0) Default, (1) SUPPRESS_DISPLAY, (2) PW_REQUIRED: 0 [Return]

Select radio channel for this recipient
(0) Local speaker only, (1) Radio_1, (2) Radio_2: 1 [Return]

Recipient name (1-8 characters): STATION1 [Return]
Time prefix, 0-9999 mS [50]: 100 [Return]
Frequency1 (0-20000.5 Hz): 273.5 [Return]
Time duration1 (0-9999 mS) [1000]: [Return]
Time suffix (0-9999 mS) [0]: [Return]
Frequency2 (0-20000.5 Hz): 318.0 [Return]
Time duration2 (0-9999 mS) [3000]: [Return]
Time suffix (0-9999 mS) [50]: 100 [Return]
Repeat count (1-99) [1]: [Return]

New recipient 12 STATION1 added for page 1 button/key 2.

Select recipient management action
(A)dd, (E)dit, (C)opy, (D)elete or e(X)it ? X [Return]

| STEP-BY-STEP TONE-OUT OPERATION | OPTICAL DISPLAY VIEW | RADIO ACTION |
|---|---|---|
| Power On | | IDLE |
| Signal generator begins initialization routine clears buffers and index pointers, clears transmit queue and displays default | System STATUS:<br>Initializing... | |
| Page 1 recipients appear on optical display. | STATION1 STATION5<br>STATION2 STATION6<br>STATION3 STATION7<br>STATION4 STATION8 | |
| Dispatcher presses Select button/key 1<br><br>Update optical display to show<br>Page 1 Recipient 1 (ID 11) selected<br>Add recipient ID 11 to transmit queue<br>Await further input | * STATION1 STATION5<br>STATION2 STATION6<br>STATION3 STATION7<br>STATION4 STATION8 | |
| Dispatcher presses Select button/key 8<br><br>Update optical display to show<br>Page 1 Recipient 8 (ID 18) selected<br>Add recipient ID 18 to transmit queue<br>Await further input | * STATION1 STATION5<br>STATION2 STATION6<br>STATION3 STATION7<br>STATION4 STATION8 * | |
| Dispatcher presses Next button/key<br><br>Advance current page index pointer +1<br>Update optical display to show Page 2 Recipients<br>Await further input | Medic_01 RESCUE_2<br>Medic_02 Ladder_1<br>Medic_03 Ladder_2<br>Rescue_1 ALL_CALL | |
| Dispatcher presses Select button/key 3<br><br>Update optical display to show<br>Page 2 Recipient 3 (ID 23) selected<br>Add recipient ID 23 to transmit queue<br>Await further input | Medic_01 RESCUE_2<br>Medic_02 Ladder_1<br>* Medic_03 Ladder_2<br>Rescue_1 ALL_CALL | |
| Dispatcher presses SEND button/key<br><br>Update optical display to show SENDING<br><br>Begin transmission of three recipients in current transmit queue. | Now SENDING:<br>STATION1 | Push-to-Talk activated RADIO 1<br><br>Programmed STATION1 recipient tone-out audio signal generated and sent to radio transceiver 1. |
| First two recipients are programmed to use RADIO 1.<br>Third recipient is programmed to use RADIO 2. | Now SENDING:<br>STATION8 | Programmed STATION8 recipient tone-out audio signal generated and sent to radio transceiver 1.<br><br>Push-to-Talk de-activated RADIO 1 |
| Transmission complete.<br>Transmit queue cleared. | Now SENDING:<br>Medic_3 | Push-to-Talk activated RADIO 2<br><br>Programmed MEDIC_3 recipient tone-out audio signal generated and sent to radio transceiver 2.<br><br>Push-to-Talk de-activated RADIO 2 |
| Optical display returns to default Page 1 view.<br>Await further input. | STATION1 STATION5<br>STATION2 STATION6<br>STATION3 STATION7<br>STATION4 STATION8 | IDLE |

Figure 11

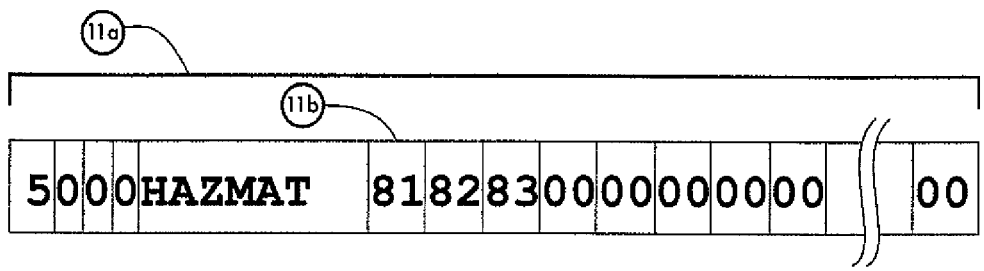

| | |
|---|---|
| "5" | Defines a complex recipient sequence |
| "0" | Defines recipient attributes |
| "0" | Defines type attributes |
| "0" | Radio channel specifier |
| "HAZMAT  " | Human-readable complex recipient name |
| "81" | Sequence sub-element_1 ID |
| "82" | Sequence sub-element_2 ID |
| "83" | Sequence sub-element_3 ID |
| "00" | Sequence sub-element_4 ID |
| "00" | Sequence sub-element_5 ID |
| "00" | Sequence sub-element_6 ID |
| "00" | Sequence sub-element_7 ID |
| "00" | Sequence sub-element_8 ID |
| • | • |
| • | • |
| • | • |
| "00" | Sequence sub-element_16 ID | ns# PROGRAMMABLE SIGNAL GENERATOR AND RADIO CONTROLLER

CROSS-REFERENCE TO RELATED APPLICATIONS

This application is a continuation of U.S. application Ser. No. 16/384,740, filed on Apr. 15, 2019, which claims the benefit of U.S. Provisional Application Patent Ser. No. 62/657,360, filed Apr. 13, 2018. The entire disclosures of which are incorporated herein by reference in their entirety.

BACKGROUND OF THE INVENTION

1. Field of the Invention

A programmable signal generator and radio controller for providing dispatch tone-out signals to first responders and other selected fields.

2. Description of Prior Art

While the present invention will be discussed in the context of first responders, such as Emergency Medical Services, police, fire fighters and more, the present invention could be used in other fields as well, and the use of first responders in the discussion of who uses tone out systems should not be considered limiting.

First responders such as firefighters, medics, police, military, and other personnel depend upon timely communication to notify them when they are urgently needed to respond to an incident. For many years, an important integral part of the communications equipment used by first responders has been the wireless audio (voice) pager. The pager device is an elegantly simple electronic device based on a radio receiver that monitors a specific communications channel for dispatch information. Pager devices are both worn on-person by various first responders as well as used as fixed annunciator devices in fire stations, police stations, and other first responders. Unlike digital numeric and text pagers, once commonplace with consumers but replaced largely by cellular phones, first responder pagers receive dispatch signals, and produce audible, visual, and tactile alerts, as well as provide live or stored dispatcher voice communications. The communication channel is typically a radio frequency system owned by the responder agency or a municipality, and is extremely reliable. First responder paging systems are generally standalone systems that do not depend on a common carrier, the Internet, or telephony carrier systems to operate. In addition, the signals reach where cell phone signals generally do not, thus maximizing ability of first responders to receive the signals and ensuring the continued use of the systems.

Radio dispatching to the pagers of first responders is commonly achieved by a trained dispatcher who uses a terminal or device at a centralized location to dispatch the correct first responders based on geographic area, predetermined protocol or procedure, or type of first response needed. More specifically, most communities use, as a primary or backup system, a tone out system that uses a series of audible tones broadcast over a dispatch radio frequency to alert specific resources or personnel that they have an assignment. The frequency is typically unique from nearby communities to prevent first responders from other communities from inadvertently receiving the signal and causing confusion.

In addition, the tone out system may activate a large variety of other devices, such as in a fire station setting, fire station alarms, pagers, crew bus signal bells, and other devices, all of which serve to get the attention of the appropriate personnel. For example, a whole station, certain personnel, such as career personnel, part time personnel, voluntary personnel, or just certain equipment may be toned out by the system, and the tone out signals may also turn on lights, set up alerts, turn on exhaust system blowers and other equipment in preparation for the desired action. A first responder may use the tones for an almost unlimited number of alerting applications or custom functions.

The term "tone out" may also refer to the portion of a dispatch broadcast which includes these tones, as well as the actions taken by the signaled personnel. In summary, when working properly, the tone out systems for first responders work very well at getting the proper people and equipment mobilized as desired, and are very reliable, self-contained systems managed at a local level typically without relying on commercial telephone providers, the Internet, or other third-party services.

The tones are typically a tuned audible sound or sounds. There are many different types of tone outs, and depending on the manufacturer of the system and age of the system, the type of tones used may vary widely. Some can have a single tone that is several seconds long, some may have a two-tone signal, and others may even have four, five or more tones in rapid succession. Others can use multiple concurrent audio tones producing a complex sound similar to the sound heard when dialing a phone number on many DTMF "TouchTone" phones. However, the tones are comprised of many differing frequencies or may be detuned to not match or comply with standard telephone company signaling frequencies such as those used to dial telephone numbers, to prevent unintentional dialing of proximate phone systems.

Existing tone out systems generally generate a signal that is sent wirelessly to the desired receivers. The type of receivers may vary and may include pagers carried by personnel, receivers attached to equipment, or receiving apparatus connected to higher powered transmitters that act as repeaters. The receivers may be attached to equipment as described above and upon receiving the desired tones, respond or provide a signal that prompts a device or controller to respond by performing steps. All these exemplary receiver devices are configured or programmed to respond to specific sets of frequencies for the tones, as well as typically a specified wireless communication channel.

Originally, receiver devices had one or more mechanical reeds that would vibrate at a particular audio frequency. When the reed vibrated because the receiver device heard a matching harmonic audio tone, the reed's resonant motion caused activation of a secondary switch or alerting device.

These simple systems worked so well, many systems added a second sequential tone for expanding paging capability. The second tone allows for more unique tone combinations, and more possibilities to perform additional functions as described above. Both tones would have to be received in sequence and for specified time durations for the pager or receiver to recognize them. One of these implementations became the well-known "Two-Tone" one-second-three-second tone paging system. There are many similar systems by various vendors. Another paging development was to activate the receiver whenever either reed vibrated for a long time, such as five seconds. This became a "group" or long tone page. Station alerting was introduced as a firehouse-wide radio receiver device that would alert all crew members on duty in the station when, for example, a fire station's unique tones were received.

As described above, this has evolved even further with the introduction of digital radios and TCP/IP networked systems. Unfortunately, there is no single standard, and many older protocols and systems remain in use. Today, the radio receivers, such as pagers, are small computers with an antenna. Mechanical vibrating reeds are typically no longer used, so the audio tones can be more complex. The audio tone sequences are decoded by a radio and signal processor and cause it to perform an action, however most first responders can recognize the tones if they are listening to a radio scanner. In view of all the developments, the commonly deployed two-tone system has several hundred possible codes, enough for each station in a large district. In comparison, a 5-tone system or multiple concurrent tone system may have hundreds of thousands unique codes, with the advantage of using wildcards or group codes in the radio's decoding configuration. This works well in larger municipalities and cities that have hundreds if not thousands of personnel and equipment units. The tone frequencies by each system, at least each system within signal range of another system, are unique, and, in addition are transmitted on different radio frequencies as compared to adjacent communities, which may be within broadcast reception range, thus preventing undesirable false alerts.

However, this safety measure of unique frequencies is also one of the problems with these systems. If two adjacent communities would like to support and communicate with each other, currently they need separate additional tone out systems, additional transmitters and new equipment for many of the personnel. This is impractical due to cost and technical concerns. Therefore, this has typically restricted most first responders from combining systems or allowing one community's dispatch personnel to cover for another community's dispatch personnel from a remote location. More specifically, the current systems are very limited in their ability to produce tones, as they use an analog oscillator that is prone to drift and a variety of capacitors, activating select capacitors to generate specific tones. As such, the system has discrete hardware to generate the tones, and what is programmed at the factory is the only tones it can generate. Therefore, if a different tone needs to be generated, a new device is needed. Replacement of these devices are very expensive. In addition, all the hardware and specific capacitors make the devices very large and take up precious desk space at dispatch centers. Therefore, there is a need for a tone-out system that is truly user programmable, and does not require switching of hardware components to generate new tones.

Another problem is that these tone out systems are very difficult to program. Today the interfaces are typically a touch screen that then communicates with a hard-wired radio console system. Some older systems still exist that typically are simple physical buttons on a device that are labeled with paper labels or tape without the ability to reprogram without specialized equipment. In addition, there are a variety of manufacturers of these systems and often one manufacturer's system cannot interoperate with another manufacturer's system. Currently there is little or no cross compatibility.

Even though some first responders have moved to digital radio, Internet, or TCP/IP networked systems or other systems that use third party carriers, most still retain the locally administered and locally owned wireless analog tone out system as a backup, as failures of these new networked systems have been more frequent than desired due to issues in communication, such as fiber optic transmission lines being cut, Internet denial-of-service attacks, and third-party equipment failure. Digital radio systems also lack the fringe coverage area of analog radio systems, resulting in unreliable performance. For example, with digital radios the signal will not reach personnel in basements of buildings or other areas, where the traditional analog systems still can reach. The traditional analog systems use wireless frequencies that reach people even in basements or other areas that digital radio signals due to frequency propagation and encoding differences typically do not reach. In addition, during a major crisis, local first responder paging systems such as the tone systems, have been demonstrated to be more reliable than Internet or common-carrier-based solutions.

First responder pagers make use of a large variety of proprietary and open standards regarding the audible signaling protocol used to differentiate messages intended for different personnel. A common element of the signaling protocol is one or more audible tone signals, with very precise frequency and waveform shape requirements. The required precision of the tones requires a narrow tolerance range, generally less than +/−5 Hz, and many times +/−3 Hz. Sequences of tones may be used to actuate and alert a single pager worn by a specific responder person, or may be used to alert an entire fire station or a large responder group such as a hazardous materials response team. Tone sequence choices can be affected by audio performance and bandwidth of the transmission channel or medium used to deliver the tone signals to the receiver device. Differing transmission mediums such as trunked radio systems, geographically diverse hybrid digital radio systems, and remote transmitter repeaters connected by telco carrier circuits are prone to distortion and attenuation of high frequencies.

Digital radio systems cannot accurately transmit audio tones without significant distortion due to limitations induced by the digital compression algorithms required by digital transmission. Attempts have been made by some vendors to improve digital radio system tone transmission by differentiating near-end analog voice signals from near-end analog tone signals, and re-generating the tones synthetically at the far end, rather than transmitting the tones in the same manner as the voice signal via compressed audio. Unfortunately, this requires the near-end compression algorithm to effectively act as a tone receiver device using digital signal processing methods which may be unreliable, resulting in incorrect frequencies being generated synthetically at the far-end. If an incorrect frequency is received, the receiver, such as a desired pager, may not activate causing at times life threatening delays in emergency response.

Over the years, various manufacturers have produced complete paging systems, as well as paging solutions comprised of interconnected products from many different manufacturers. In some cases, certain manufacturers have discontinued paging products or entire systems, and in some cases, have gone out of business or have been absorbed into other corporate entities, complicating access to technical support for legacy installed equipment. There is a very large installed base of existing paging equipment in use worldwide. In fact, the sheer numbers of individual pager devices, both fixed and mobile, such as carried on personnel, limits adoption of alternative systems. Further, no alternative communication signaling approaches can replace the reliability and coverage area of the analog tone paging system in conjunction with analog radio transmitters.

In order to generate the signaling sequences required to alert various first responders in a typical municipal environment, emergency dispatchers, usually at a local or regional 911 communications center (also known as a PSAP or Public Safety Answering Point), use specialized equipment. Most dispatch consoles offer touch-screens, computer screens, to allow dispatchers to dispatch or "tone-out" specific responders. The tone signaling protocols in use by a particular municipality often dictate the types of dispatcher signaling equipment that can be purchased in order to maintain backward compatibility with the large number of pager and alerting devices in use by the first responders. Dispatch consoles may be part of an integrated radio system, or connected to a computer aided dispatch ("CAD") system, or both.

Multiple agencies may share a single dispatch center, requiring generation of different signaling protocols for transmission on multiple radio frequencies, often with remote radio equipment. Centralized dispatch consoles are often part of a very complex interconnected radio system that in some cases may be managed by another larger entity, such as a county or state. Technical problems arising from equipment failures and unexpected service outages can result in loss of ability to dispatch first responders. Because of the wide variety of signaling protocols in use for first responder paging systems, and because other types of audible signals are often sent over analog wireless channels, many different types of signal generators or encoders are required to implement the primary dispatch system. Producing a secondary system for emergency backup purposes to allow signaling to occur in the absence of the primary system is a difficult task. There are very few standalone signal generators that can produce a limitless variety of audible signals while maintaining close adherence to precise frequency tolerances and wave shape specifications. Previous attempts at portable paging tone generators have resulted in products that are difficult to program, difficult to use, and do not provide a direct view of available responder entities, like lists of fire stations, for the dispatcher to rapidly select and alert, or tone-out.

In addition to all the problems described above, most of the commonly installed present-day dispatch paging systems do not have a cost-effective backup system. If the primary (and often only) dispatch paging system is inoperative or has an outage, there are limited options to activate certain personnel or equipment. Many of the present-day systems are old systems that run on old electronic equipment, and are becoming highly fragile and difficult to maintain. In addition, systems that include touch screens can lose dispatcher functionality as the touch sensing elements age and become unreliable, often with no prior notification. Selecting multiple stations or personnel tone-out groups then becomes cumbersome and error-prone. Therefore, there is a need for a simple, reliable, and easy to program tone signal generator that can work stand alone or in combination with a variety of modern systems, and yet reproduce nearly unlimited tone variations.

SUMMARY OF THE INVENTION

The present invention provides a system and method to provide dispatch tone-outs that is cross system compatible, cost efficient, reliable, easy-to-program, and has an intuitive dispatcher interface that simplifies selection and paging of tone-out groups, and recipients.

The system may be easily programmed to generate a wide selection of different tones, and different tone patterns, such as single, two tone and 4-5 tones or more that common systems use, as well as more complex simultaneous multi-frequency tones such as DTMF, MF, and other polyphonic signals.

The system can be easily programmed so that a tone pattern for a specific organizational entity such as a fire station or responder personnel group can be assigned to a single control panel button or key, with a short, easily-recognized human-readable recipient name.

The system can be easily programmed to produce arbitrary alert signals or sounds for alerting personnel directly, such as a high/low yelp sound or a series of beeps to indicate, for example, cancellation of a dispatch run.

The system can be easily programmed to combine individually constructed tone patterns into longer sequences, such as to allow a single operator control panel button to page a group of stations sequentially.

The system can be easily programmed to generate a complex tone sequence, such as a Morse code sequence, for radio channel identification purposes as may be required by various government communications regulatory bodies.

The system can be easily programmed to generate a vendor-specific tone sequence, such as Knox Sentralock® tones, for releasing security access devices in first responder vehicles.

The system can be optionally programmed to log dispatch activity, including the date and time of day. Log information is stored in the non-volatile memory 2 and references the current time-of-day as reported by the on-board real time clock 3. Reports may be retrieved as text via the serial console terminal 15, an integrated interface or operator control panel 8, or may accessed remotely over the secure network via the network interface 1*l* and remote dispatcher screen 14. Of course, other types of devices may be connected to communicate with the system 1*a*. The on-board real time clock 3 may also be synchronized to the PSAP or dispatch center time-of-day clock, a GPS satellite clock 16, or any other.

The present invention uses mechanical pushbuttons, although these could be touch or otherwise configured, around perimeter of an LCD, organic LED, fluorescent, or other optical display. The LCD or local dispatcher screen 7*h*, if included as part of the integrated operator interface 8, is part of or interfaces with the user interface control logic 7. One benefit of the mechanical pushbuttons is that a dispatcher cannot inadvertently make incorrect recipient selections by accidental touch and incorrectly initiate transmission of paging tones to the wrong recipients. In addition, the recipient selection and transmission initiation processes are separate, and in some instances may be sequential, so that the dispatcher must first select the desired recipients, and then initiate the transmission sequence by pressing a separate pushbutton. The present invention also has a halt pushbutton that will stop the current tone transmission in progress. It should be noted that the signal generator 1*a* may be made without the integrated user interface 8, and instead remotely controlled through a remote dispatch screen 14, CAD system 1*n* or other third party digital radio counsel system 1*m*.

The individual buttons and the optical display, can be programmed, with the optical display having changeable human-readable text associated with each pushbutton. Existing systems frequently rely on buttons with fixed hand-written or printed paper labels that can fade, fall off, or otherwise become unreadable. Fixed labels cannot be changed dynamically under software control, requiring a larger number of buttons resulting in a larger more cumbersome operator control panel and limiting the flexibility and maintainability. The present invention makes use of fewer buttons with dynamically changeable associated text, vastly reducing control panel size and improving maintainability. Replacement of fixed labels also enhances interchangeability of the signal generator hardware, as reconfigurations or additions of paging recipients does not require making new fixed labels. In addition, the system also benefits from the ease of programming the functions associated with the buttons and the readout next to each button.

The signal generator as described in the detailed description may generate a wide range of waveforms, tones, or patterns of tones. All this is done cost efficiently, accurately and the signal generator can be used as a backup or a primary system. Instead of using large desktop PC and large touchscreens, or touchscreen tablets, laptops or mobile smart phones and associated application software "apps", the present invention may be configured to be a small robust, portable, and easy to use package that does not require Internet or network connectivity for the user interface to function. The present invention does not require special programing software loaded on it as compared to many competitive devices. An isolated Ethernet network connection may be provided for additional functionality such as secure remote access or interoperability with other dispatch systems over a TCP/IP network. A point-to-point serial connection may be provided for additional functionality to allow the present invention to receive real-time time-of-day clock signal information. Such time-of-day clock signal information is typically furnished by a satellite clock receiver device synchronized to the GPS satellite constellation, but may also be furnished by a clock receiver synchronized to the WWV time reference, as available in the United States.

The system may also solve the near-end, far-end problem encountered by digital radio systems, and avoid missed tone outs by allowing the signal generator to be controlled directly over a TCP/IP network with network messages, completely eliminating the need, for the digital radio system to process the audio stream to detect and re-generate tones. For example a dispatch console can request a specific tone numerically via TCP/IP, and the signal generator will generate a precise analog tone for transmission over the desired analog radio channel. This functionality can be integrated with existing digital radio systems allowing responder agencies to continue to use their analog receiver devices (pagers, etc.) within the context of a new digital radio system. Since the signal generator is also functional as a standalone device, failure of the digital radio system and its consoles does not affect the ability of the signal generator to generate tones and control the analog radio transmitters connected to it.

The present invention generally relates to a signal generator configured to generate tone out signals broadcast over radio transceivers and antennas, and allows for easy programing of new tones by an operator without requiring changes in hardware components or electrical circuitry. The signal generator generally includes a microprocessor module, a multi-channel synthesis core and frequency generator in communication with the microprocessor module, and a radio interface control logic in communication with the microprocessor module. The multi-channel synthesis core and frequency generator is configured to produce frequencies specified by the microprocessor module for specified time periods, and can also generate the desired wave shape.

The signal generator may include a user interface in communication with the microprocessor module, which may include a user interface control logic module and is in communication with at least one of an integrated user interface and an input from a remote user interface.

The signal generator may further include a master reference oscillator that outputs a master frequency, and wherein the microprocessor module provides a division factor to the multi-channel synthesis core and frequency generator to divide the master frequency to obtain the desired frequency. As stated above, the multi-channel synthesis core and frequency generator is capable of outputting the desired frequency with a desired wave shape.

The signal generator further includes an audio signal conditioning and amplification module in communication with the microprocessor module. The microprocessor module instructs the audio signal conditioning and amplification module to set an amplitude of the desired frequency.

The signal generator may further include a multitude of ports, including at least one communication port and wherein the microprocessor module is capable of being directly programmed with selected frequencies, amplitude, and wave shape through the at least one communication port, such as the illustrated serial counsel port, auxiliary serial port or the LAN port. One major benefit during programming is that the signal generator is programmed with the direct desired frequency wavelength and other attributes and not a tabular industry reference value number that is a reference to a specific frequency.

The signal generator further includes a real time clock and a memory module configured to store a plurality of recipients and a tone encoding associated with each recipient. The tone generated with the tone encoding includes a frequency wavelength, and amplitude of the wavelength, and a specified wave pattern. While the tone may include a single tone, the tone may be made from at least two tone portions, each having a distinct frequency wavelength, and each having an amplitude and a specified wave pattern associated with each individual tone portion. In addition, the signal generator may directly set the amplitude of a channel.

The signal generator may further include a radio isolation interface and PTT driver module in communication with the microprocessor and wherein the microprocessor may change channels of the radio transceivers to match a programmed radio channel associated with a selected recipient. The signal generator may be controlled by a remote and geographically removed control system, and wherein the signal generator includes the ability to exercise local control using an integrated user interface. Local control is beneficial because the signal generator may be portable.

One advantage of the signal generator is that the multi-channel synthesis core and frequency generator is capable of generating audible signals from 0.001 Hz to well over 20 Khz, with a precision of at least +/−0.05 Hz, more specifically +/−0.02 Hz, and more specifically +/−0.01 Hz.

The signal generator may further be directed to a microprocessor module capable of being directly programmed with selected frequencies, amplitude, and wave shape; a user interface control logic module in communication with the microprocessor module; and a radio interface control logic in communication with the microprocessor module. The signal generator may further include a multi-channel synthesis core and frequency generator in communication with the microprocessor module wherein the multi-channel synthesis core and frequency generator is configured to produce frequencies specified by the microprocessor module for specified time periods.

The signal generator may further include a user interface in communication with the microprocessor module and wherein the user interface includes a user interface control logic module and is in communication with at least one of an integrated user interface and an input from a remote user interface.

The signal generator may further a master reference oscillator, and wherein the microprocessor module provides a division factor to the multi-channel synthesis core and frequency generator to obtain the desired frequency.

The signal generator further including an audio signal conditioning and amplification module in communication with the microprocessor module and wherein the microprocessor module instructs the audio signal conditioning and amplification to set at least one of the amplitude and wave shape of the frequency input to the audio signal conditioning and amplification module from the multi-channel synthesis core and frequency generator.

The signal generator further including at least one communication port and wherein the microprocessor module capable of being directly programmed with selected frequencies, amplitude, and wave shape through the at least one communication port.

The signal generator further including a real time clock and a memory module configured to store a plurality of recipients and a tone associated with each recipient.

The signal generator wherein the tone includes a frequency wavelength, and amplitude of the wavelength, and a specified wave pattern, and wherein the tone includes at least two tone portions, each having a distinct frequency wavelength, and each having an amplitude and a specified wave pattern associated with each individual tone portion.

The signal generator further including a radio isolation interface and PTT driver module in communication with the microprocessor and wherein the microprocessor may change channels of the radio transceivers to match a programmed channel associated with a selected recipient.

The signal generator may be controlled by a remote and geographically removed control system. The signal generator is configured to be portable and can easily be moved. The signal generator includes the ability to exercise local control using an integrated user interface The s the multi-channel synthesis core and frequency generator is capable of generating audible signals from 0.001 Hz to well over 20 Khz, with a precision of at least +/−0.05 Hz The signal generator is also configured to generate tone out signals broadcast over radio transceivers and antennas, and allow for easy programing of new tones by an operator without requiring changes in hardware components or electrical circuitry, and includes a microprocessor module capable of being directly programmed with selected frequencies, amplitude, and wave shape; a user interface control logic module in communication with the microprocessor module; a radio interface control logic in communication with the microprocessor module; and a multi-channel synthesis core and frequency generator in communication with the microprocessor module wherein the multi-channel synthesis core and frequency generator is configured to produce frequencies specified by the microprocessor module for specified time periods.

The signal generator is capable of being directly programmed with a frequency wavelength in hertz, and is capable of generating a programmed frequency wavelength between 0.01 Hz and 20 kz with a tolerance of less than or equal to 0.01 Hz.

The signal generator is capable of generating its own tones, including tones made up of multiple tone portions by durations, frequencies, amplitudes and wave patterns. The signal generator is capable of allowing the amplitude of each channel to be programmed directly, and has the ability to communicate with the radio transceivers and change radio channels. The signal generator also has the ability to provide dual tones, without requiring sequential tones to provide such dual tones.

The signal generator including a network interface, and wherein the signal generator is capable of receiving instructions through the network interface from a geographically remote user interface, in addition to a local interface.

DESCRIPTION OF FIGURES

FIG. 3 is an exemplary Plain-text Programming Language for the illustrated tone sequence in FIG. 2;

FIG. 4 is an exemplary Plain-Text Command Language Dialogue for tone sequence described in FIG. 2 and FIG. 3;

FIG. 6 is an exemplary execution flow diagram for typical tone-out operation upon dispatcher/operator request;

FIG. 11 is an exemplary plain-text programming language example for the complex recipient tone sequence illustrated in FIG. 10.

DETAILED DESCRIPTION

Figure 1:
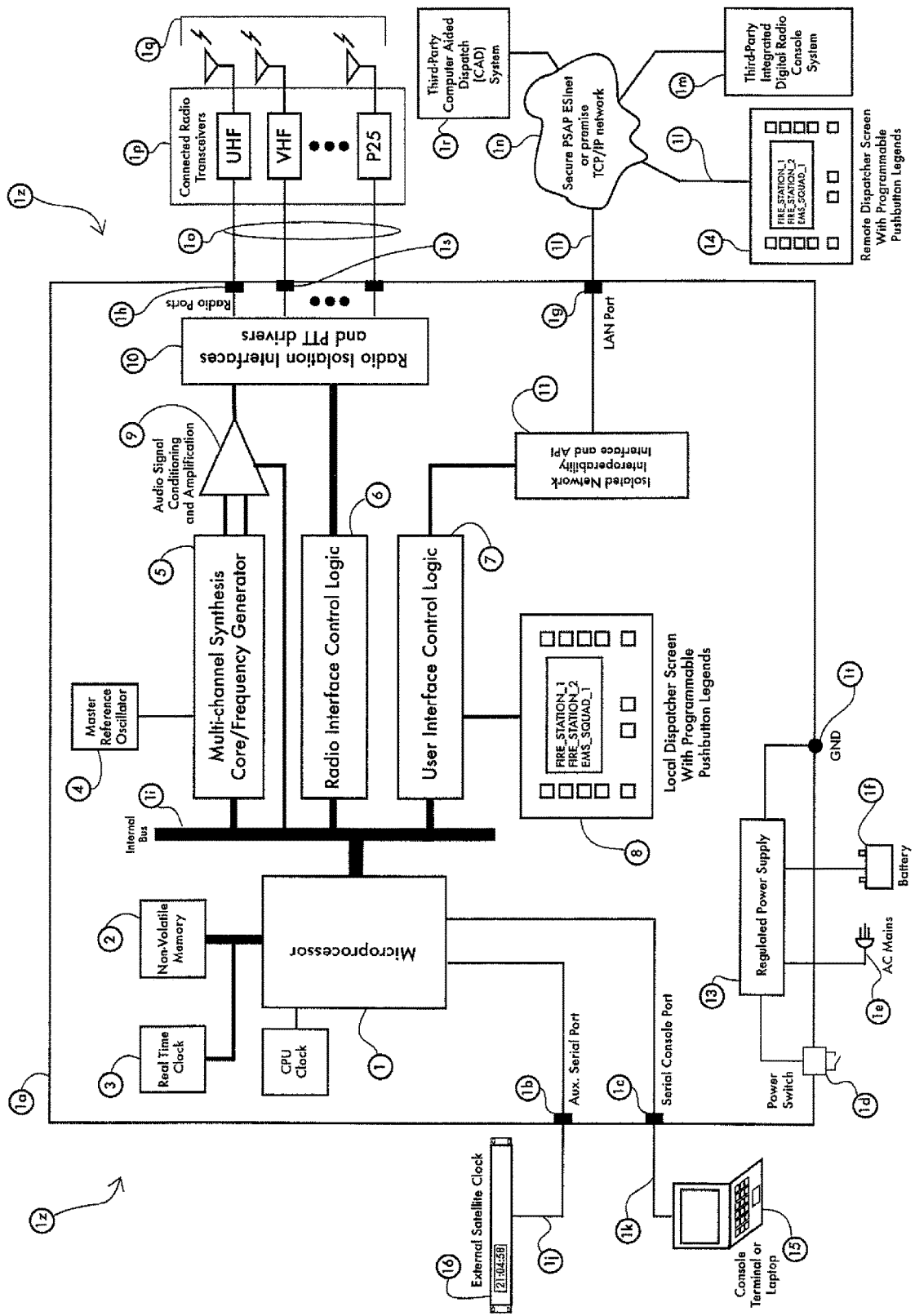
FIG. 1 is a schematic view of an exemplary signal generator system.

The present invention generally relates to a hybrid audible signal generator device, referred herein to as a signal generator 1a, a tone system 1z including the signal generator 1a, and a method of programming and using the signal generator such as those used for first responder applications including fire/ems emergency medical services tone paging over public safety radio systems. The signal generator 1a is highly programmable, capable of supporting all common signaling protocols currently in use, as well as the creation of custom protocols, in an audible signal range from 0.001 Hz to well over 20 KHz, with a precision of +/−0.01 Hz on average with programmable amplitude.

The signal generator 1a may be configured to include a simple configurable direct-view user interface 8 that allows use by dispatchers without specialized training. The signal generator 1a also supports extensive event logging and remote accessibility, including over secure TCP/IP networks 1n and secure serial links 1c, 1k.

The signal generator 1a may include flexible output ports 1h, 1g, 1b, 1c, 1c to simplify connection to a wide variety of radio apparatus. Use of a stable proven display 7h and operator actuator technologies contributes to a long operating lifetime compared to costly contemporary touch-screen LCD displays such as found in smart phones and tablets.

The signal generator 1a makes use of hybrid digital and analog techniques to generate an almost limitless selection of signal protocols for first responder alerting, while also supporting common ancillary signal formats used to transmit other alerting information, activate responder quarters lighting, release secure key lockers onboard responder vehicles, and other applications. The signal generator 1a is controlled by a highly simplified user interface 8 that allows dispatchers to access the capabilities of the device without extensive training.

Configuration of the signal generator 1a is made using a simple plain-text programming interface and a serial terminal, such as a laptop 15 or a dedicated terminal emulator (not illustrated) or other external connection. The signal generator configuration can also be "cloned" from another similar device, allowing for easy replication of configuration on multiple devices, such as for backup spares or for cross-agency coordination. The synergies of the combined control and signal cores allows for a highly reliable, highly capable, and low-cost first responder signal generator 1a that can be used in many different applications. The invention can operate as a standalone signal generator 1a, programmed to satisfy the signaling needs of a specific entity, or it can be used as a sub-component of much larger scale solution, including controlling multiple radio devices. As illustrated in FIG. 1, the signal generator 1a may be connected to the laptop 15 for access to the plain-text command line interface 4a, as illustrated in FIG. 4.

In addition to supporting customizable standard signal formats such as one-tone, two-tone, DTMF, Morse code, and other tone-out signal protocols, the signal generator 1a may also support a complex recipient type. A complex recipient type allows the creation of custom tone-out signals that may contain multiple previously-programmed recipients. A complex recipient definition would allow, for example, combining several individual recipients, such as fire stations, into a single logical group accessed by pressing a single dispatch screen using the next or previous page buttons 7d or 7g and then the selection keys 7b, 7c and repeating as needed, followed by the send button 7f.

Figure 10:
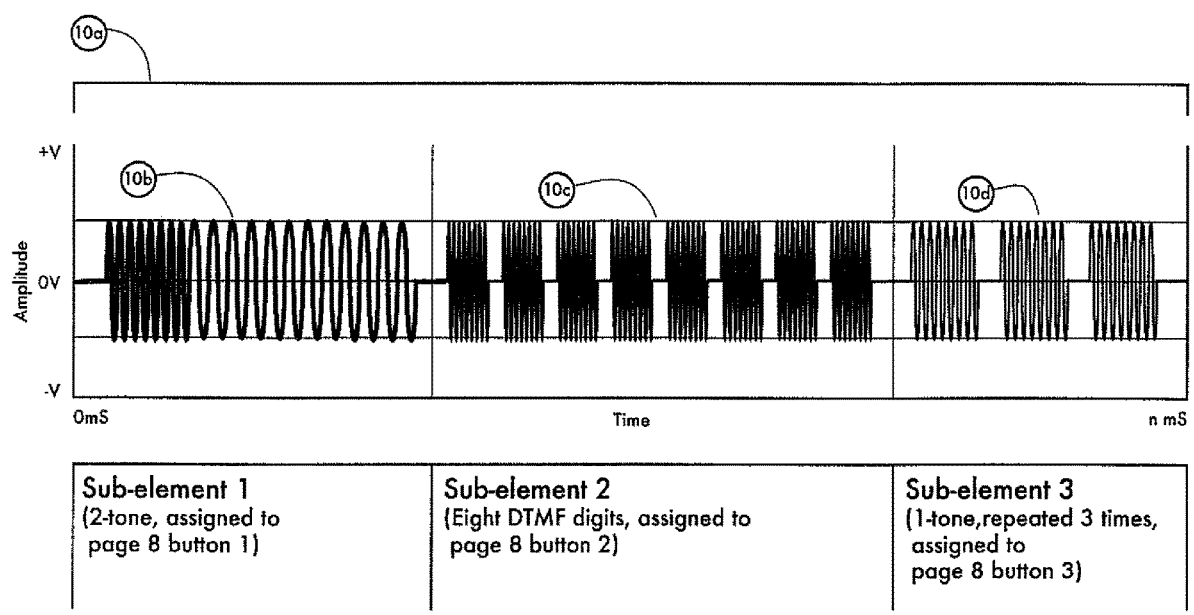
FIG. 10 is an exemplary complex recipient type including three sub-elements of a tone sequence.

Alternatively, for first responder entities with complicated alerting equipment applications, the complex recipient type may be used to assemble different signaling sequences together. FIG. 10 depicts an exemplary tone-out sequence that includes a two-tone signal, an eight-digit DTMF signal, and a single-tone that repeats three times. Each of the three sub-elements is programmed separately as a standalone recipient first. Then the complex recipient is programmed, and the three individual sub-element identities are inserted, forming the completed complex signal sequence. FIG. 10 only illustrates exemplary tones and any type of tone may be generated or combination thereof.

In certain instances, it may be desirable to not allow the individual sub-elements to be visible to a dispatcher or operator on the dispatcher screen or control panel 8, 11, 14, 1r or 1m. The signal generator 1a provides a recipient attribute modifier 3b that allows the display to be suppressed. The recipient, normally displayed, thus will not appear on the dispatcher screen or control panel. Since the sub-elements do consume page memory space, a typical installation might locate the sub-elements on the very last page or pages of the signal generator's 1a non-volatile memory 2.

No currently available standalone signal generators are capable of mixed signal types being chained together easily to create complex signal sequences in the same manner as the present invention.

The signal generator is configured to provide direct control over the audible frequency generated with extreme precision (+/−0.01 Hz typically) as well as the amplitude (voltage) of the resultant signal delivered to the attached radio or transmission equipment 12, using an audio signal conditioning element 9, and connected through the radio interface control logic 6 and radio isolation interface 10. Amplitude adjustment allows pre-compensation for non-linear frequency response of various communication networks, and can help improve reception clarity of certain first responder pager signaling protocols. Many first responder entities are implementing secure ESInet architectures, with dedicated fiber optic and wireless network segments isolated from the Internet to carry mission-critical public safety information. The signal generator 1a may provide a way to interoperate with digital radio dispatch consoles, CAD systems, and other PSAP equipment over the ESInet or similar secure Ethernet network via the network interface 11. The network interface 11 may implement a simple Application Programming Interface (API) allowing third-party entities to request specific operations, query configuration data, and initiate tone-out transmission remotely using industry standard protocols and plain-text queries.

The signal generator 1a embraces a multitude of configuration and operator interface options and can be remotely directed over a network. The signal generator 1a generally uses a Microprocessor 1, a Real-time Clock 3, an EEPROM nonvolatile memory 2, and a RAM memory (which may be internal to the Microprocessor 1). A simple plain-text programming language, which allows complex tone encoding protocols to be implemented, and easily accommodates new custom tone sequences may be used. A master reference oscillator 4 may also be used which provides a highly stable frequency reference for the multi-channel direct synthesis core.

The present invention can easily accommodate flexible input-voltage power supply (vehicle battery, AC mains, other) via the regulated power supply 13, and the Multi-Channel Direct Digital Synthesis signal generating core 5 may produce high-precision signals with selectable wave shape and frequency. The signal amplitude of individual single or dual-tone protocols may be adjustable to pre-compensate for non-linear frequency response of connected transmission equipment and networks. In addition, amplitude is easily programmable in the plain-text programming language.

Other considerations and benefits of the signal generator 1a include amplification and galvanic isolation to protect connected radio equipment 12. A galvanically isolated control for Push-To-Talk actuator interface 10 of connected radio equipment allows direct connection to existing off-the-shelf radio transceivers 12 with simple cabling 10. An integrated operator interface 8 with a flexible illuminated alphanumeric display screen 7h and with perimeter buttons 7b, 7c, 7d, 7e, 7f, or 7g, or equivalent user actuator, or touch-screen user buttons provides ease of use and simple operating engagement. The signal generator may also include a serial interface 1b, and 1c, an Ethernet network interface 1g, or other desired network interfaces, whether hardwired or wireless. The signal generator 1a may use an isolated network interoperability interface 11 to securely connect with other devices, including but not limited to a remote dispatcher screen 14, which may be part of a CAD system, as discussed above. The regulated power supply 13 is also illustrated. The signal generator 1a may include onboard diagnostics, a keyboard or a touchscreen or other input device, and may allow for button/key debouncing in hardware and software.

As stated above, the signal generator may allow for direct computation of frequency divisors to produce accuracy of +/−0.001 Hz over wide range of frequencies. Of course other frequency tolerances may be allowed so long as they meet specifications of the tone systems. The signal generator 1a may include a software technique for generating complex waveforms such as DTMF, MF, Knox Sentralock, and telecom call progress and network tones (busy, off-hook, etc.) or any other sequences of tones. As illustrated in FIG. 1, an audio signal conditioning and amplification module or device 9 may be included. The conditioning and amplification module or device 9 are connected with the radio interface control logic 6 to a radio isolation interface and PTT drivers 10, which is in turn connected to the various radio transceivers "1p," which may be UHF, VHF or any other frequency band desired.

In addition, the signal generator 1a may include the ability to adjust waveform amplitudes and compensate for attenuation associated with increasing frequencies. This may be accomplished by the microprocessor module 1 or a separate module. In certain configurations, the signal generator 1a may have the ability to record time/date information associated with specific signal or tone out requests by a dispatcher/operator, and/or output that information to another machine or device. The signal generator 1a may even be configured to be able to produce summary reports of recorded event information, and even have the ability to search recorded event history by date, by event type, and other search criteria. Of course, secure operating code stored on non-volatile memory 2 that is strongly resistant to hacking and unauthorized alteration is desirable. As currently configured, the Internet connectivity is NOT required for licensing or updating, although it could be included.

Figure 5:
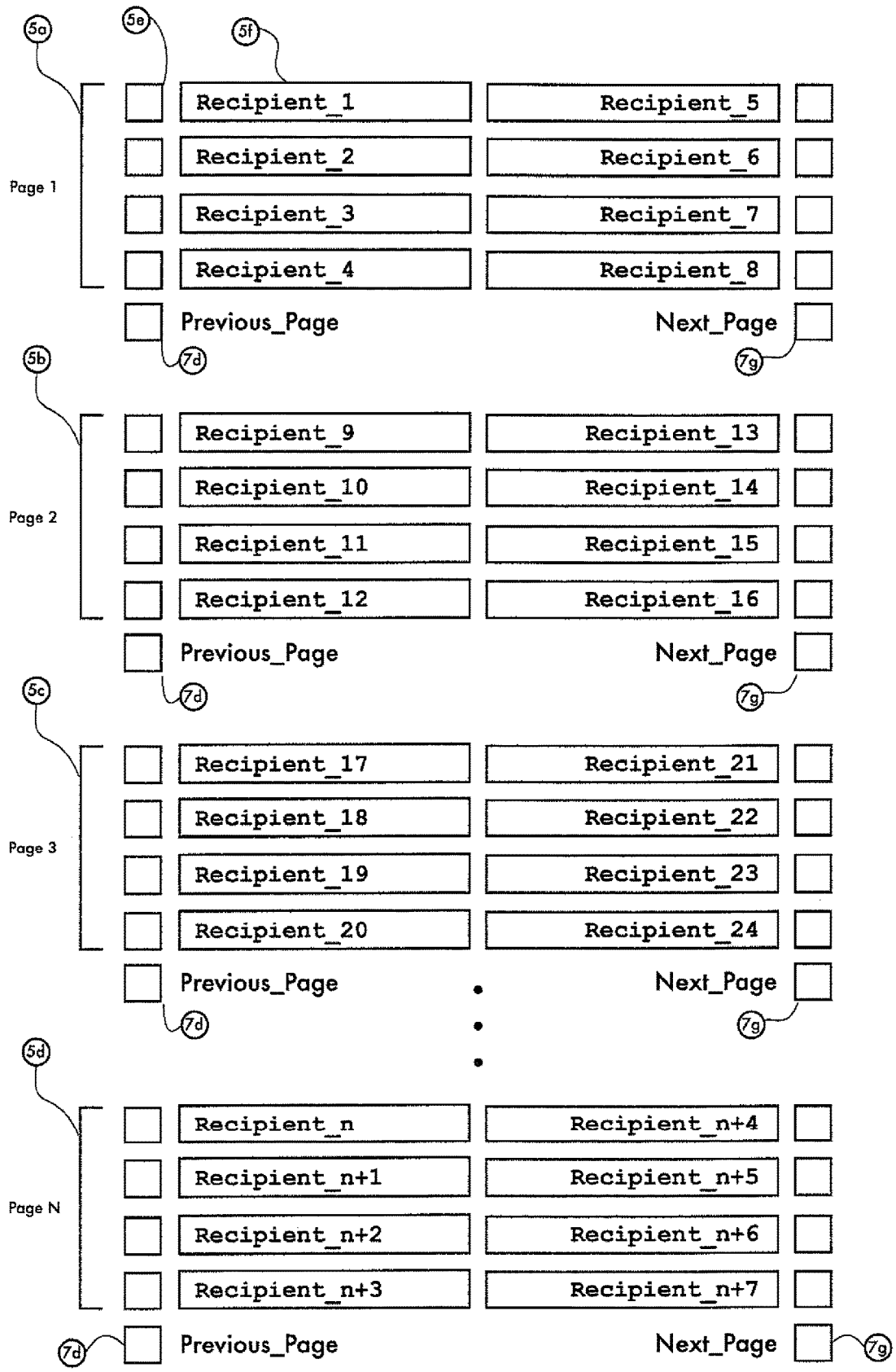
FIG. 5 is exemplary dispatcher screens showing possible button/key assignments and page navigation with each process of the Previous/Next button.

As stated above, one huge benefit of the present invention of the signal generator 1a is that it can concurrently control the operations of multiple connected radios. Regional or adjacent public safety agencies frequently use different radio frequency bands, such as VHF and UHF, for tone-outs. The signal generator 1a through the radio isolation interfaces and PTT drivers 10, radio ports 1h, and radio cables 1o allow radios operating on different frequency bands to be concurrently connected to the signal generator 1a. Since the appropriate radio channel associated with a recipient has already been programmed and stored in the non-volatile memory 2, a dispatcher need not be concerned about which radio is being used to transmit the tone-out being requested. Upon pressing the dispatch screen 8 pushbutton for a specified recipient 7i, the signal generator 1a refers to the recipient configuration details stored in the non-volatile memory 2 to activate the appropriate radio transceiver 1p. This allows multi-agency alerting to be handled from a single device on multiple radio bands which was never previously possible. Further, the signal generator 1a may communicate interactively with a connected radio transceiver 1p over the radio connection cable 1o to select a particular radio frequency communication channel, effectively tuning the radio on demand. For example, as illustrated in FIG. 5, Page 1 could contain a recipient with a particular VHF radio frequency channel of 155.8050 MHz, and another recipient with a UHF frequency of 423.0500 MHz. The signal generator will automatically select the correct radio for transmission based on the programmed recipient information stored in the non-volatile memory 2. In the event of multiple recipients in the same radio frequency band but with differing communication channel frequencies, the signal generator may communicate with the radio to request the radio change the current operating frequency to the appropriate value.

The invention makes use of flexible operator control panel architecture 8 enabling a fixed set of buttons/keys 7b and 7c to be labeled with different tone-out recipients 7i, grouped in pages, 5a, 5b, 5c and 5d as illustrated in FIG. 5. Stored recipient pages 5a, 5b, 5c, and 5d can be navigated by use of page navigation buttons/keys 7d and 7g. The invention allows the operator or administrator to arbitrarily assign a given tone-out such as the illustrated tone-out 2a in FIG. 2, to a recipient associated with a specific button/key selected from the selection buttons 7b or 7c on a specific page, allowing grouping of tone-out recipients 5f in a way that is meaningful and efficient for operator or Dispatcher use. For example, multiple apparatus or crew units from a single fire station might be grouped together on a single page, with other stations grouped on different pages, or other departments grouped on other pages.

The signal generator 1a provides a unique and special type of tone-out recipient format that allows multiple single recipient configurations to be assembled together in a sequence, which may be assigned to a button or key, such as a key selected from the keys in the group of keys 7b. Such sequencing might be used to tone-out a group of fire stations or a group of individuals for a particular incident type, or for programming complex custom alerting signals assembled from several different signal types, such as a single tone followed by a DTMF tone sequence.

The system 1z, including the signal generator 1a, and the individual components, as well as the external components such as the radio transceivers 1p and antennas 1q will now be discussed individually in detail.

The Microprocessor 1 or microprocessor module 1 executes operating system code instructions to implement the signal generator 1a functions, including control of multi-channel frequency synthesis core 5, audio signal conditioning and amplification/gain module 9, and interface functions, or parts 1b, 1c, and 1g such as the illustrated serial ports 1b and 1c, user interface control logic 7, and network interoperability interface, illustrated as the Isolated Network Interoperability Interface and API 11 in FIG. 1. It should be noted that while the signal generator 1a is discussed as having the tones and recipients stored internally, it is possible to store these on an external device, such as the illustrated console terminal 15, which can be part of or in communication with the Remote Dispatcher Screen 14, CAD 1r, or a third party integrated Digital Radio Console System 1m. The microprocessor module 1 may also implement internal housekeeping functions such as storage and management of user-defined signal protocols, recipient tone configurations, event logging and communication with real time clock 3 and external reference clock, such as the illustrated satellite clock 16.

The non-volatile memory module 2 provides storage for user-programmed signal protocols, recipient tone configurations, event logs, and device usage statistics and may be accessed by and is in communication with the microprocessor module 1.

The real-time-clock module 3 includes a crystal oscillator or resonator and at least one on-board backup battery to maintain an accurate time-of-day clock reference for the device. The real-time-clock 3 can be manually corrected or automatically updated with information from an external clock reference 16. It should be noted that the signal generator 1a may use any type of time device or timer capable of providing accurate time intervals to allow accurate and precise tone generation.

The master reference oscillator module 4 is an extremely precise clock reference for the multi-channel frequency generator 5. The master reference oscillator 4 is used to set the frequency of the tones shown in FIGS. 2 and 10. Operating frequency of the master reference oscillator 4 is multiple orders of magnitude above the signal generator 1a output frequency range, which specifically can be millions of times greater, allowing for precise division down to the configured output frequencies with very small error.

The multi-channel synthesis core/frequency generator module 5 divides the master reference oscillator clock 4 by a programmable divisor and uses the result as an input to a direct-digital-synthesis core that is part of the illustrated frequency generator 5 that produces the desired wave shape (sine, saw tooth, or square) output signal. At least two channels are required to produce multi-tone signals such as DTMF, MF, or CAMA. Users may program other custom protocols using their own multi-tone protocols. More specifically DTMF, MF, and CAMA are comprised of at least two simultaneous frequencies summed together, and as such need at least two channels to produce the multi-tone signals.

The radio interface control logic module 6 is under the control of the microprocessor 1 which selects which radio device will be receiving a Push-To-Talk signal and the resultant generated audio signal including the tone. Selection logic also assures that signal output only occurs when specifically requested by device user, and prevents accidental radio transmissions. Control logic also can be programmed to communicate with, typically serially, with external radio equipment 1p that supports serial communications. Such communications may allow for checking radio status or selecting a specific transmission channel frequency within the radio's band capability. By managing the radio settings, a single radio device could cover multiple agency transmission frequencies, within the same RF band, and multiple radios in different bands, under direct control of the signal generator device 1a.

The user interface control logic module implements the keyboard matrix decoder functions and drives the multi-line optical display 7i that identifies keyboard or button 7b, 7c functions. Logic uses a key debounce function to prevent accidental key selection due to mechanical switch contact bounce, and provides multi-key lockout in the event that two or more keys 7b, 7c are pressed simultaneously due to user error. As illustrated in FIG. 1, the user interface control logic module 7 may receive instructions from a user using the user interface 8 on the signal generator, specifically the display 7h (optional) and buttons 7b, 7c or any other compatible input device or item capable of providing reliable input with minimal errors. The user interface control log or module 7 may also receive instructions from external devices, such as the illustrated computer aided dispatch (CAD) system 1r.

The Local Dispatcher Interface 8 generally includes integrated keyboard or buttons 7b, 7c and an optional optical display module 7h that faces device user or operator, such as a public safety dispatcher at a public safety answering point ("PSAP"). As stated above, the local or integrated dispatch interface 8 communicates with user interface control logic module 7.

The audio signal conditioning and amplification module 9 is configured for signal conditioning sub-component sums of individual signals from the multi-channel synthesis core 5, and permits programmable gain adjustments to individual channels independently under microprocessor 1 and user program control. Multi-tone frequencies are subject to non-linear attenuation, particularly at higher frequencies and receiving tone decoders in receivers at the far-end experience this phenomenon and may have difficulty accurately decoding the multi-tone signals illustrated in FIGS. 2 and 10. The signal conditioning sub-component of the audio signal conditioning module 9 allows pre-compensation to be applied to generated signals before being sent to a non-linear transmission channel, thus correcting the signal that arrives at the far-end and assuring reliable reception and accurate decoding by the receiver, such as a pager. A non-linear transmission channel is one that has an amplitude characteristic that changes relative to frequency in a manner that is not flat or linear. Typical voice radio channels, for example, will attenuate the input audio signal more as the frequency increases beyond a certain point. Such attenuation may not affect human speech intelligibility much, but it can significantly impact accurate transmission of signal tones. This frequency-dependent attenuation effect can be reduced or eliminated by pre-compensation, or intentionally sending the higher frequency signals at increased amplitude. By increasing the input amplitude of higher frequency signals, the resultant received signal at the far end will be at the correct amplitude, as the increase at input cancels the attenuation during transmission.

The radio isolation interface and PTT drivers module provides an isolation interface that allows safe connection of the signal generator 1a to external radio transmission equipment, such as the illustrated transceiver 1p and antennas 1q, while providing galvanic isolation between the signal generator 1a and the external equipment 1o, 1p, and 1q.

The isolation is desired to reduce audible and radio frequency noise emissions, and to prevent unexpected radio operations. Push-To-Talk (PTT) control of a radio requires completing an external circuit to the attached radio transmission equipment by closure of a wire pair. This function is achieved with the use of a relay or equivalent semiconductor device having high off-state resistance. The signal generator 1a is configured to work with and interface with almost any type of radio equipment.

The isolated network interoperability interface module 11 allows interoperability with external devices such as the illustrated devices 14, 1m and 1r in FIG. 1, and the interface subcomponent implements a basic set of TCP/IP protocols to permit communication between the signal generator device and external devices over a secure TCP/IP network such as an ESInet. Such secure networks are increasingly common in Public Safety Answering Point (PSAP) facilities. Typical communications between the signal generator 1a and external equipment might include an integrated radio communications console at a central dispatch center remotely requesting specified recipient tone sequences to be generated and transmitted at a radio tower site miles away.

The connected radio transceivers 1p are external radio transmission equipment, commercially available with multi-pin control connectors, and connect to the signal generator 1a via a cable 1o. One or more radios 1p may be connected in this manner. Radios 1p may operate in different frequency bands, such as VHF or UHF, and may be analog or digital or hybrid. A central dispatch center that provides tone-out signaling to multiple agencies might need to transmit certain signals on a VHF frequency and other signals on a UHF frequency. Multiple radios 1p may thus be connected simultaneously, and the signal generator 1a, through the radio interface control logic 6 chooses which radios 1p receives which signals. As illustrated in FIG. 1, more than the two discussed UHF, VHF radio transceivers 1p and antennas 1q may be included.

The regulated power supply 13 may be any suitable power supply sub-component that accepts main voltage, in fixed applications, or battery voltage, in mobile applications, or even some combination thereof and produces stable logic and analog signal processing sub-component supplies.

The remote dispatcher screen 14 may be connected via a secure network, such as an ESInet, the operator functions typically available on the Local Dispatcher Screen 8 can be made available remotely, such as on a hardware control panel or implemented in software as part of an integrated radio dispatch console, which may communicate with the Application Program Interface (API) in the isolated network interface.

The console terminal 15 is an external device that may be connected, such as a laptop, text terminal, or other readout device with a keyboard or other input device capable of communicating, such as through industry-standard RS232 serial communications as exemplary illustrated in FIG. 1, and allows direct command-line access to the operating system software executing on the microprocessor 1. Such command-line access might be used during configuration of tone recipients or viewing of tone-out events stored in non-volatile memory 2. Please note that the illustrated remote dispatching screens consoles, digital radio systems and CAD systems may also be configured or programmed to perform some or all of these functions.

The External Satellite Clock 16 illustrated in FIG. 1 is an external time clock reference which may be connected via industry-standard serial protocol to the signal generator device for the purposes of synchronizing the internal Real Time Clock module 3 to a global time standard such as UTC via GPS. Please note any external clock may be used and this is not required, or the system time may be manually set or synchronized to a time reference provided by the remote dispatch systems 14, 1r or third party systems 1m.

Figure 2:
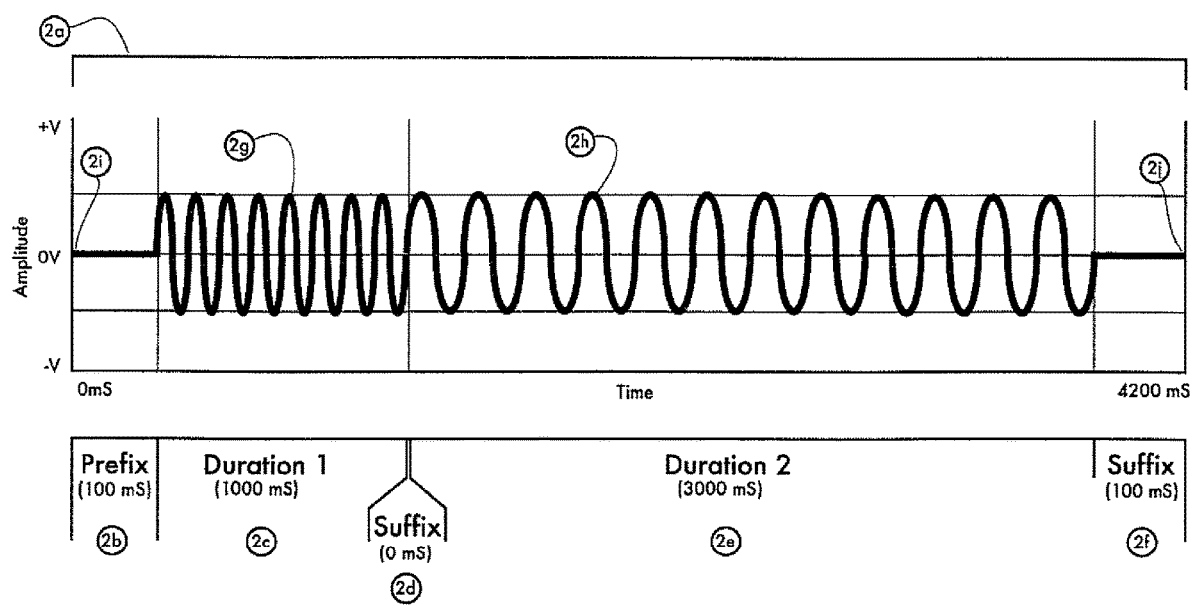
FIG. 2 is a graphical representation of a typical two-tone audio signal sequence oscillogram of a tone sequence.

A typical two-tone audio signal sequence oscillogram and sub-elements output of the signal generator 1a is illustrated in FIG. 2. The specific components of the tone 2a will be discussed in more detail below. The tone 2a is an exemplary and typical two-tone tone-out signal transmission sequence comprising approximately 4200 milliseconds elapsed time. Time may vary due to arbitrary lengths of Prefix 2b and Suffix 2f. The Prefix 2b is the time between transmitter initiation 2i via Push-To-Talk activation of radio, and the beginning of the first audible frequency 2g. The Duration 1 or first location 2g of a two party exemplary tone 2a is the time duration of the first audible frequency 2g, in seconds. All times and illustrated frequencies are exemplary and may vary in size, shape, frequency and duration. The great beauty of multiple tone systems is the wide variety of tones they may initiate using only minor variations to the time and frequency.

The Suffix 2d is silent time between end of first audible frequency 2g and the second audible frequency 2h, in milliseconds. In this particular example, the programmed suffix time is zero milliseconds, so there is no silence gap between the two audible tones and the immediate switch without gap is clearly illustrated. The Duration 2 or second duration is the time duration of the second audible frequency 2h, in milliseconds. The second frequency 2h is generally different than first frequency 2g to provide the two tone system. The Suffix 2f or end suffix or second suffix illustrated in FIG. 2 is the silent time between end of second audible signal 2h and termination of transmission 2j by deactivating Push-To-Talk control of radio. More than two suffixes may be used on more complicated tones.

The Frequency 1 or first frequency 2g is the first audible frequency signal to be transmitted. The signal is typically a sinusoidal AC waveform, but may be other wave shapes. The second Frequency 2h is the second audible frequency signal to be transmitted, after the first. The Signal is typically a sinusoidal AC waveform, but may be other wave shapes. The second frequency 2h is typically different than first frequency 2g.

FIG. 3 illustrates an exemplary plain-text programming language description for the tone sequence illustrated in FIG. 2. A block 3a of US-ASCII text characters that together comprise the signal generator's coded definition of a typical two-tone tone-out signal, shown in FIG. 2. Plain-text characters define specific characteristics of the signal, and are human-readable. The block 3a is broken into smaller blocks with descriptions of each block, in a logical descending order that matches the characters appearance from the left to right. The block 3a of the text may include a recipient attribute block or character 3b. The illustrated single-character recipient attribute 3b may be used to define specific characteristics about how the signal generator 1a should process a specific recipient 7i. For example, the recipient attribute character 3b may be used to determine if the programmed recipient 7i appears on the dispatcher screen 14 or control panel or is invisible.

FIG. 4 illustrates an exemplary plain-text command language example for tone sequence described in FIG. 2 and FIG. 3. Any example of text 4a, which may be displayed on the console terminal 15 as result of command prompts from signal generator 1a to operator, and operator's responses to signal generator 1a. The text 4a exemplifies typical communications exchange, from the viewpoint of the signal generator 1a, between the human operator and the signal generator 1a during the task of programing the signal generator 1a to add a new tone-out recipient. The text 4a includes a dollar sign "$", which is a command language interpreter prompt, appearing on the console terminal 15, indicating interpreter is awaiting typed input from the operator. The text 4a may also include a single-character command operator 4c, illustrated in FIG. 4 as "M", which is used to request management of tone-out recipients stored in the non-volatile memory 2. Of course the M is exemplary and other commands could be programmed. The text 4a may also include a return key 4d, which indicates a key on the console terminal or laptop keyboard pressed by operator to transmit a command or operand response to the signal generator.

When the console provides a prompt, it usually is a ":", or colon 4e indicating the operator is expected to type a response. The text 4a shows a default value indication 4f The default value indications 4f uses square brackets "[ ]" indicate the command language interpreter is providing a suggested default or previously-stored default value. If operator presses the return key 4d without entering additional data, the default value will be treated as user input for that particular operand or parameter.

FIG. 5 illustrates an exemplary list of dispatcher screen button/key assignments, which would appear on the signal generator operator interface 8, or on the remote dispatcher screen 14 with programmable pushbutton legends. Each of the pages 5a, 5b, 5c, and 5d may be selected by pressing the buttons for next page or previous page, illustrated as 7d for previous page in FIGS. 7 and 7g for next page in FIG. 7. The select buttons, 7b, 7c include an individual button next to each recipient display line 5f. Please note that while the display 7h of the signal generator interface 8 includes four buttons on each side of the display 7h, the number of buttons may vary, as well as their placement and configuration, however the signal generator is arranged to minimize potential mistake of toning out the wrong recipient. The blocks of page views, 5a, 5b, 5c, . . . 5d are demonstrating a single page of eight recipients associated with eight dispatcher screen or operator panel buttons/keys 7b, 7c on the signal generator interface, whether it is the local signal generator interface 8 or the remote dispatch screen 14. Please note that while the remote dispatch interface 14 is styled and configured as the signal generator interface 8, it could be an electronic version on a touch screen, or a larger version with more selection buttons 7b, 7c or have a different arrangement, such as a more elongated vertical arrangement as compared to the square shape illustrated in the figures. However for ease of use, it is imagined that may implementations will make the local signal generator interface 8 and remote dispatch interface or screen 14 match or be close in configuration to each other to maximize the familiarity between the devices for operators. In the page views illustrated in FIG. 5, the recipient numbering is sequential and relative, beginning at 1 and progressing to n recipients, in the illustrated examples, with each screen only containing 8 recipients, however this number is arbitrary and could be any set number of recipients.

Each logical grouping of eight recipients 5f is called a page, such as the illustrated pages 5a, 5b, 5c, 5d. The recipient selection button/keys on the interfaces, 8 and 14 are illustrated as 7b and 7c. Pressing selection button/keys, selected form the group of keys 7b, 7c causes the signal generator 1a to select or de-select the specified recipient from the queue of recipients 7i to later be transmitted when the Dispatcher or operator presses the Send button/key 7f for sending. The selection and queuing of the desired recipients 7i may extend across multiple page views. Of course, to avoid selecting each person individually, the signal generator 1a may be programmed so that each recipient 7i is a group of persons, equipment, stations, or any other grouping. As such Recipient 1 illustrated in FIG. 5 may read "Station 1" and selecting it would send a tone to all the persons and equipment relevant and programmed related to Station 1. The queue may automatically clear upon a pressing of the send button 7f, or the operator could press the clear button 6e. If the queue includes a mistake, it can be cleared and all presently queued recipient de-selected by pressing the Clear button/key 7e. It could be programmed so that a short press deselects a selected individual, last individual or allows an operator to press a selection button after pressing the clear button 7e to deselect a specific recipient. A long hold on the clear button 7e could clear the whole queue.

Figure 7:
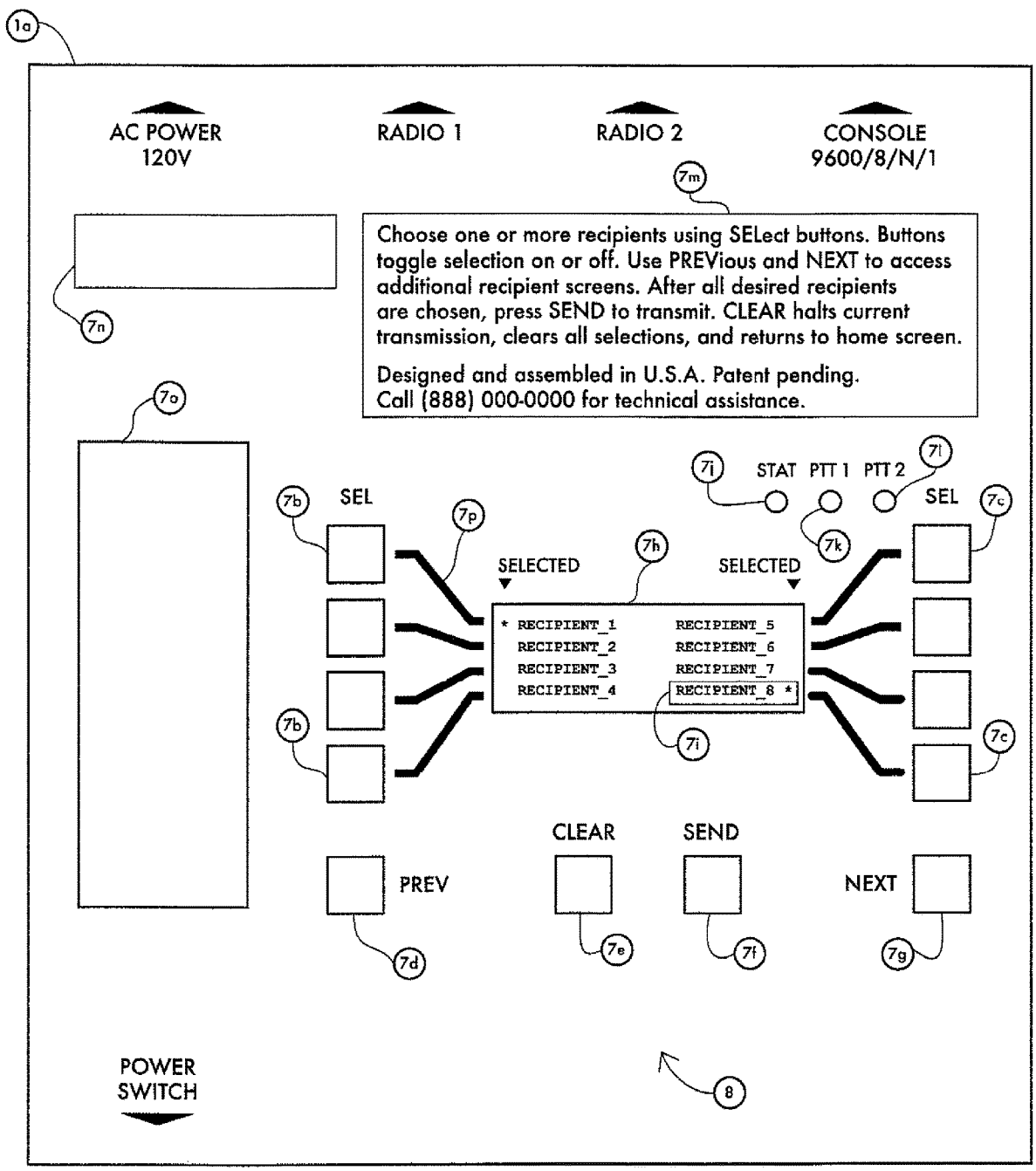
FIG. 7 is a front view of the signal generator with an exemplary dispatcher screen or operator panel detail.

As illustrated in FIGS. 5 and 7, the recipient names 7i may include human-readable text characters that identify a tone-out recipient in a way that is meaningful to the operator or a Dispatcher. A typical recipient name might be a fire station such as "Station1" or an operation crew group such as "EMS North", or an individual such as "Jane Smith". The navigation buttons, as discussed above may include previous page 7d and next page 7g buttons. The previous page button button/key 7d on the interface 8, 14 causes the signal generator 1a to move the current page displayed index backwards to a previously displayed page. If at the first page, no action occurs. The next page navigation button/key 7g on the interface 8, 14 causes the signal generator to move the current page displayed index forwards to the next page to display. If at the last defined page, no action occurs.

FIG. 6 illustrates an exemplary step-by step tone-out operation, including selecting multiple recipients 7i, now identified as a particular station or equipment. In a multiple recipients queued situation, FIG. 6 clearly shows how the signal generator will typically send out the tone outs for specific recipients sequentially, however if the signal generator included multiple frequency generators 5, it could do multiple tone outs simultaneously. However, given the very short time to execute a tone out, as illustrated FIGS. 2 and 10, there is typically no need to perform the tone outs simultaneously. As such FIG. 6 clearly illustrates an exemplary execution flow diagram for typical tone-out operation upon dispatcher/operator request.

FIG. 7 illustrates an exemplary signal generator with focus on the local signal generator interface 8, which may also be similarly provided at the remote dispatch system 14. The dispatch screen or operator panel detail diagram 7a is printed, painted or otherwise engraved on the outer surface. The operator panel detail is optional, but helpful by putting all the basic operation instructions right in front, as viewed by a human dispatcher or operator. The legend information 7a typically describes button/key functions 7b and 7c and provides summarized operating instructions. The select buttons/keys 7b and 7c are similar, each associated with, using the optional line 7p extending to a recipient 7i. In the left column four buttons 7b are spatially mapped to the leftmost optical display 7h column of recipients 7i. Optical display shows the human-readable text characters for a programmed recipient, such as a named fire station or crew group. The right side group of select buttons 7c are similar with similar functions. One skilled in the art would recognize that the size, shape, number, placement and arrangement of buttons could vary. For example, only 5 could appear on one side with a more elongated display.

As the page navigation buttons PREV 7d and NEXT 7g are manipulated by the operator, additional programmed recipient names may appear, capable of being selected by the pressing of one of the select buttons 7b and 7c. More specifically, the PREVious page navigation button/key 7d allows backwards navigation through programmed recipient pages. Pressing the button 7d causes the signal generator 1a to move the currently displayed page index backwards one page. If at the first page of programmed recipients, no further action occurs, but the signal generator 1a may be programmed to cycle to the last page. Similarly, the NEXT page navigation button/key 7g allows forward navigation through programmed recipient pages. Pressing the NEXT button 7g causes the signal generator to move the currently displayed page index forwards one page. If at the last page of programmed recipients, no further action occurs, but the signal generator may be programmed to also return to the first page of recipients. The last page may be also be reserved as a special system information page which provides information about the current hardware and software version, the current date and time derived from the on-board real time clock. The last page may not have any active recipient information displayed, and could be an instruction manual. In addition, there may be a help or instruction button (not shown) that may allow the signal generator to display a more detailed version of the operating instructions.

The CLEAR button/key 7e clears the current to-be-transmitted recipient queue, and navigates to the first page of programmed recipients. If a transmission is currently in progress, pressing this button causes the signal generator to halt transmission at the end of the currently transmitting recipient, clears the to-be-transmitted recipient queue, and navigates to the first page of programmed recipients.

The SEND button/key 7f causes the signal generator to enable Push-To-Talk (PTT) signaling to the attached radio transceivers 12, illustrated in FIG. 1 and begins generating the audible frequency tone signals as defined by the selected recipient configurations. Optional LED or other indicators 7k and 7l illuminate to indicate which radio transceiver is actively transmitting the signal.

The optical display 7h provides an illuminated view of the human-readable text recipient names and their transmission queue selection status. The display 7h may be vacuum fluorescent, LED, back-lit or reflective LCD, or OLED, or a similar technology providing a daylight-readable, high-contrast rendering of alphanumeric characters and graphical elements.

The recipient name 7*i*, is an exemplary programmed recipient name, in human-readable text. An asterisk "*", arrow, or similar graphical element is used to indicate the current transmission queue selection status. Pressing a SELection button/key in the left 7*b* or right 7*c* columns allows toggling of selection status for a recipient 7*i*. Exemplary recipient 7*i* names may be seen in the other figures.

The system STATUS indicator 7*j* is an optical illuminated indicator that indicates the current operational status of the signal generator. This is optional and may be illustrated in other ways. In the embodiment illustrated in the figures, a status indicator 7*j* when illuminated steady indicates normal operations. Non-illuminated means not ready, error, or power off condition. Repeated blinking or sequenced groups of blinks may be used to indicate descriptive fault code status conditions to the dispatcher or operator.

The signal generator 1*a* may also include a PTT 1 indicator 7*k*. An optical illuminating of the PTT 1 indicator 7*k* that indicates that Push-To-Talk signal for attached radio transceiver Radio_1 is actively transmitting. Non-illuminated condition indicates PTT is not being asserted. The signal generator 1*a* may include a second PTT indicator 7*k*, or PTT 2. Optical illuminating indicator that indicates that Push-To-Talk signal for attached radio transceiver Radio_2 is actively transmitting. Non-illuminated condition indicates PTT is not being asserted for the second radio transceiver.

The signal generator 1*a* may include summarized operator instruction text 7*m*, which may be human-readable non-technical instructions to a human dispatcher or operator, describing how to select one or more programmed recipient (s) for transmission. The signal generator's user interface is intentionally designed to be simple to use without extensive training, and no ancillary operator instruction manual is required.

The signal generator 1*a* may include a logo area, such as for a manufacturer logo 7*n*. The signal generator 1*a* may also include model information 7*o*, such as printed brand, model, or product family information.

Figure 8:
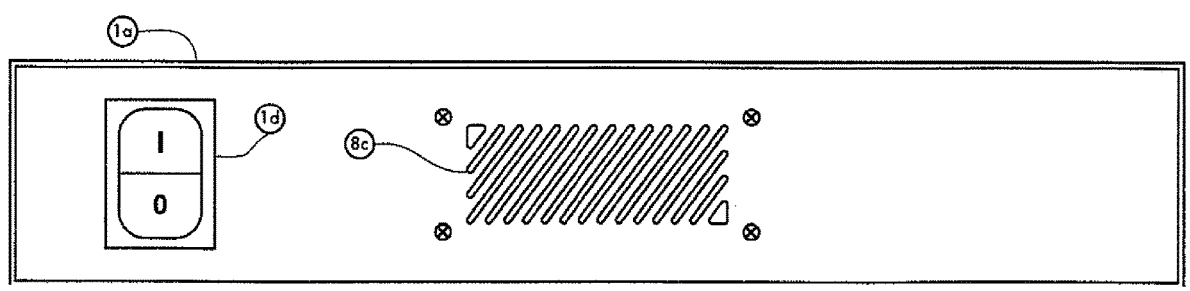
FIG. 8 is an exemplary signal generator front panel.

FIG. 8 illustrates an exemplary signal generator 1*a* front panel, which may include a power switch 1*d* and an audio outlet, such as the illustrated grille 8*c*. The power switch 1*d* may be used to control power supply main input. Moving the switch to the "1" position applies power to the signal generator. Moving the switch to the "0" position removes power from the signal generator 1*a*.

Figure 9:
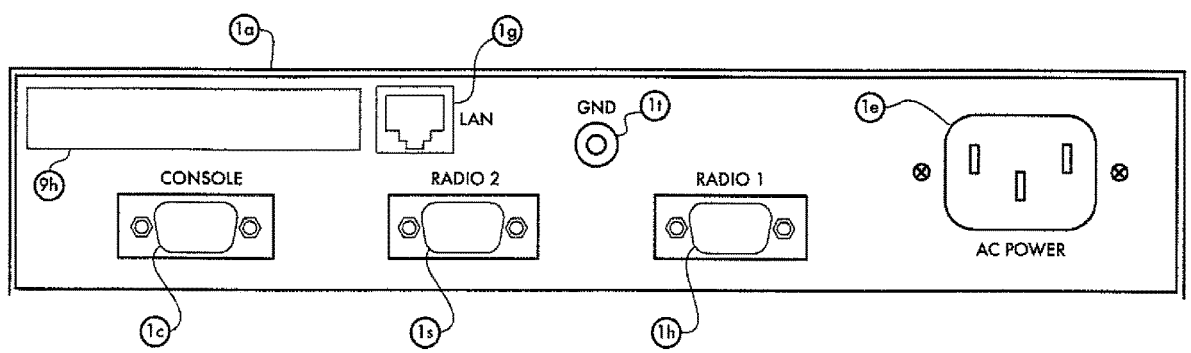
FIG. 9 is an exemplary signal generator back/rear panel.

FIG. 9 illustrates an exemplary signal generator 1*a* back/rear panel. The exemplary signal generator 1*a* enclosure back/rear panel may include AC power connector 1*e*, radio port connector(s), console port connector 1*c*, earth grounding screw 1*t*, Ethernet local area network RJ45 connector, and manufacturer serial number and regulatory approval information label. The AC power connector 1*e* may accept industry-standard detachable two-wire with ground power cord. The earth grounding screw 1*t* may be in any size, shape or configuration, and the illustrated screw has a threaded stud with knurled thumb nut. The earth grounding screw 1*t* may allow connection of equipment grounding conductor as is typically required by electrical code and industry best practices for safety grounding. The console serial port 1*c* allows a connection of a console terminal (FIG. 1 No. 15), laptop or other accessories. Any other type of connection interface may be used, existing or developed in the future.

The radio 1 port 1*h* allows connection of a radio transceiver (FIG. 1 No. 12). The port 1*h* provides galvanically isolated Push-To-Talk contact closure, galvanically isolated balanced audio signal, and RS232-level serial transmit and receive data connection to a radio transceiver. Similarly radio 2 port 1*s* allows connection of a second radio transceiver 12 and provides the same connections as 1*h*. The ethernet LAN RJ45 port 1*g* allows connection of the signal generator's isolated network interoperability interface 11 to an external secure network such as an ESInet within a PSAP or dispatch center, or a similar closed-loop secure TCP/IP network within a public safety communications facility. The manufacturer label 9*h* may include model number, serial number, Ethernet hardware address, regulatory approval information, and manufacturer support contact information.

FIG. 10 illustrates an exemplary complex recipient type including three sub-elements of an exemplary oscillogram 10*a*. The exemplary oscillogram 10*a* for a complex recipient is assembled from the three different signal type sub-elements 10*b*, 10*c*, and 10*d*. Such complex recipient oscillogram 10*a* might typically be used for large municipalities with advanced tone-out signaling requirements, or for triggering specialized equipment in a fire station or other facility. The sub-element audio signals 10*b*, 10*c*, and 10*d* are generated sequentially by the signal generator and presented without additional silence gaps.

The complex recipient is programmed by first programming the individual sub-elements as if they were standalone recipients. They may be assigned to dispatcher screen buttons/keys which will appear, or may be set to be assigned but not visible or selectable. Once the individual sub-elements have been programmed, the complex recipient can then be programmed, specifying the ID numbers of the individual sub-elements that will together comprise the complete complex recipient. ID numbers consist of the page number and button/key number as organized and depicted in 5*a*. Sub-element 1, 10*b* is an exemplary depiction of a typical two-tone signal, similar to that described in FIG. 2, sub-element 2 10*c* is an exemplary depiction of an eight-digit DTMF "Touch-Tone" sequence, and sub-element 3, 10*d*. Example depicts a single tone burst repeated three times. Typical of a human-audible signal to alert personnel.

FIG. 11 illustrates an exemplary plain-text programming language example for complex recipient tone sequence in FIG. 10. Block of US-ASCII text characters 11*a* that together comprise the current invention's coded definition of a typical complex recipient signal as shown in FIG. 10. Plain-text characters define specific characteristics of the complex recipient, and are human-readable. Individual sub-elements 11*b* are specified with a two-character ID, the first character being the page number, and the second character being the recipient button/key assignment for that page, as set forth in 5*a*.

The tone generator system 1*z* includes a tone generator or signal generator 1*a*, a power source such as AC mains 1*e* or a battery 1*f*, at least one radio transceiver 1*p*, and radio connection cable 1*o*. The at least one radio transceiver 1*p* must be connected to an antenna 1*q*. To program tone-out recipients in the signal generator 1*a*, a console terminal device such as a laptop 15 may be connected to the signal generator with a serial cable 1*k*. Optionally, the signal generator 1*a* may be connected to an external clock source such as a GPS satellite clock 16 through serial connection cable 1*j* to signal generator 1*a* auxiliary serial port 1*b*. Optionally the signal generator 1*a* may also be connected to a secure Ethernet network 1*n* via an industry-standard Ethernet cable 1*l*. The signal generator 1*a* generally includes a microprocessor module 1 in communication with a real time clock module 3 and a non-volatile memory module 2, configured to store the programmed tone-out recipients. The tone or signal generator 1a further includes an internal bus 1i in communication with the microprocessor module 1 and a multi-channel synthesis core/frequency generator module 5, and a radio interface control logic module 6, and a user interface control logic module 7 configured to interface with a display module 7h on the illustrated local user interface 8.

The signal generator 1a provides unique advantages over the prior art, on such advantage is the ability to generate dual tones, such as dtmf tones. None of the prior art tone generators can generate dual tones, only sequential tones. The signal generator 1a of the present invention generates hundreds of tones without any add ons or hardware changes, and can easily be programed for different tones by the user. The present invention may also have a network interface 1l and 1g to allow the signal generator 1a to communicate with the external internet.

The microprocessor module 1 may tell the amplifier 9 how much amplification and can also specify wave shape in the multi-channel synthesis core frequency generator 5, in addition to dividing down to the desired frequency. The desired frequency is based on the signal from the master reference oscillator 4, which is divided to make the desired frequency and provides the precision and accuracy of the present invention. While no local user interface is required and the signal generator 1a may be controlled remotely, a local user interface 8 is helpful if there is communication issues with the remote user interfaces. As such a local user interface with selection, tone out or send buttons and a display is helpful as a backup or even primary interface.

Another unique aspect of the signal generator is its ability to directly communicate with the radios through the radio ports 1h and 1s. As such, the signal generator 1a may determine what model, brand, channel radios and also can change radio channels, which allows it to virtually cover every commonly used radio channel, without hardware changes. As illustrated, the signal generator 1a may be connected to the uhf and vhf radio transceivers 1p and cover almost all channels. This allows a simple selection of a recipient and pushing the send button by the operator and the signal generator may change channels and send the proper tone out signals. More specifically, one device can do what in the past could require dozens of devices for large municipalities. For example, county that provides central dispatching for their local municipalities has almost forty different radios signal generators connected and the small portable signal generator 1a of the present invention could replace all of the m with a single device, and is simple to program by a non-technical user, as compared to the county system referenced above which needed specialized technical programing with over a million dollars spent on installation cost. As more municipalities combine dispatching and other functions, the signal generator provides a simple, easy to use and cost efficient device that replaces multiple other devices. As stated above, each municipality uses different frequencies to avoid interference, and as such this expense to generate multiple frequencies has prevented many dispatch centers from combining due to cost concerns. The existing systems are also very internet and personal computer dependent and a flaw or bug in one can prevent paging out of the proper first responders and has in the past required police officers to be dispatched by radio to notify fire department personnel that their services are needed.

Another advantage of the present invention is the complex tones it can create with a single portable device. More specifically, the signal generator 1a may control multiple aspects of the tone individually, and prior art systems do not offer such flexibility. The present invention can even create non-linear wave forms.

The invention claimed is:

1. A signal generator configured to generate tone out signals broadcast over radio transceivers and antennas, and allows for programing of new tones by an operator without requiring changes in hardware components or electrical circuitry, said signal generator comprising:
   a microprocessor module;
   a multi-channel synthesis core and frequency generator, capable of generating audible signals from 0.001 Hz to 20 Khz, to form audible tones having a frequency wavelength, an amplitude of said frequency wavelength and a specified wave pattern and wherein said multi-channel synthesis core is in communication with said microprocessor module wherein said multi-channel synthesis core and frequency generator is configured to produce frequencies specified by the microprocessor module for specified time periods to produce tone out tones;
   a real-time clock; and
   a radio interface control logic in communication with said microprocessor module.

2. The signal generator of claim 1 further including a user interface in communication with said microprocessor module.

3. The signal generator of claim 2 wherein said user interface includes a user interface control logic module and is in communication with at least one of an integrated user interface and an input from a remote user interface.

4. The signal generator of claim 1 further including a master reference oscillator that outputs a master frequency, and wherein said microprocessor module provides a division factor to said multi-channel synthesis core and frequency generator to divide the master frequency to obtain the desired frequency.

5. The signal generator of claim 4 wherein said multi-channel synthesis core and frequency generator is capable of outputting the desired frequency with a desired wave shape.

6. The signal generator of claim 1 further including an audio signal conditioning and amplification module in communication with said microprocessor module.

7. The signal generator of claim 6 wherein said microprocessor module instructs said audio signal conditioning and amplification module to set an amplitude of said desired frequency.

8. The signal generator of claim 1 further including at least one communication port and wherein said microprocessor module is capable of being directly programmed with selected frequencies, amplitude, and wave shape through said at least one communication port.

9. The signal generator of claim 8 wherein said microprocessor is not programmed with a tabular industry reference value number that is a reference to a specific frequency.

10. The signal generator of claim 1 further including a memory module configured to store a plurality of recipients and a tone encoding associated with each recipient.

11. The signal generator of claim 10 wherein said tone encoding includes said frequency wavelength, amplitude of said wavelength, and specified wave pattern.

12. The signal generator of claim 9 wherein said tone includes at least two tone portions, each having a distinct frequency wavelength, and each having an amplitude and a specified wave pattern associated with each individual tone portion.

13. The signal generator of claim 1 further including a radio isolation interface and PTT driver module in communication with said microprocessor and wherein said microprocessor may change channels of the radio transceivers to match a programmed radio channel associated with a selected recipient.

14. The signal generator of claim 13 wherein said signal generator may be controlled by a remote and geographically removed control system, and wherein said signal generator includes the ability to exercise local control using an integrated user interface.

15. The signal generator of claim 1 wherein said audible signals from 0.001 Hz to 20 Khz have a precision of at least +/−0.05 Hz.

16. The signal generator of claim 1 further including a network interface, and wherein said signal generator is capable of receiving instructions through said network interface from a geographically remote user interface, in addition to a local interface.

17. The signal generator of claim 1 wherein said signal generator is configured to be portable and can easily be moved.

18. The signal generator of claim 1 wherein said signal generator may directly set the amplitude of a channel.

19. A signal generator configured to generate tone out signals broadcast over radio transceivers and antennas, and allow for programing of new tones by an operator without requiring changes in hardware components or electrical circuitry, said signal generator comprising:
a microprocessor module capable of being directly programmed with selected frequencies, amplitude, and wave shape which form audible tones;
a multi-channel synthesis core and frequency generator, capable of generating audible signals forming tone out tones from 0.001 Hz to 20 Khz using said selected frequencies, amplitude and wave shape, wherein said multi-channel synthesis core in communication with said microprocessor module, and capable of being concurrently connected to different frequency bands;
a user interface control logic module in communication with said microprocessor module;
a real-time clock; and
a radio interface control logic in communication with said microprocessor module.

20. The signal generator of claim 19 wherein said audible signals from 0.001 Hz to 20 Khz have a precision of at least +/−0.05 Hz.

21. The signal generator of claim 19, wherein said multi-channel synthesis core and said frequency generator are configured to produce frequencies specified by the microprocessor module for specified time periods.

22. The signal generator of claim 19 further including a user interface in communication with said microprocessor module and wherein said user interface includes a user interface control logic module and is in communication with at least one of an integrated user interface and an input from a remote user interface.

23. The signal generator of claim 19 further including a master reference oscillator, and wherein said microprocessor module provides a division factor to said multi-channel synthesis core and frequency generator to obtain the desired frequency.

24. The signal generator of claim 19 further including an audio signal conditioning and amplification module in communication with said microprocessor module and wherein said microprocessor module instructs said audio signal conditioning and amplification to set at least one of the amplitude and wave shape of the frequency input to said audio signal conditioning and amplification module from said multi-channel synthesis core and frequency generator.

25. The signal generator of claim 19 further including at least one communication port and wherein said microprocessor module is capable of being directly programmed with selected frequencies, amplitude, and wave shape through said at least one communication port.

26. The signal generator of claim 19 further including a memory module configured to store a plurality of recipients and a tone associated with each recipient.

27. The signal generator of claim 26 wherein said tone includes a frequency wavelength, and amplitude of said wavelength, and a specified wave pattern, and wherein said tone includes at least two tone portions, each having a distinct frequency wavelength, and each having an amplitude and a specified wave pattern associated with each individual tone portion.

28. The signal generator of claim 19 further including a radio isolation interface and PTT driver module in communication with said microprocessor and wherein said microprocessor may change channels of the radio transceivers to match a programmed channel associated with a selected recipient.

29. The signal generator of claim 19 wherein said signal generator may be controlled by a remote and geographically removed control system.

30. The signal generator of claim 29 wherein said signal generator includes the ability to exercise local control using an integrated user interface.

31. The signal generator of claim 19 further including a network interface, and wherein said signal generator is capable of receiving instructions through said network interface from a geographically remote user interface, in addition to a local interface.

32. The signal generator of claim 19 wherein said signal generator is configured to be portable and can easily be moved.

33. A signal generator configured to generate tone out signals broadcast over radio transceivers and antennas, and allow for programing of new tones by an operator without requiring changes in hardware components or electrical circuitry, said signal generator comprising:
a microprocessor module capable of being directly programmed with selected frequencies, amplitude, and wave shape;
a user interface control logic module in communication with said microprocessor module;
a radio interface control logic in communication with said microprocessor module;
a multi-channel synthesis core and frequency generator in communication with said microprocessor module wherein said multi-channel synthesis core and frequency generator is configured to produce frequencies specified by the microprocessor module for specified time periods, and wherein said signal generator is capable of being directly programmed with a frequency wavelength in hertz, and is capable of generating a programmed frequency wavelength between 0.01 Hz and 20 kz of tone out tones and wherein said signal generator is capable of operating on different frequency bands; and
a real-time clock.

34. The signal generator of claim 33 wherein said programmed frequency wavelengths with a tolerance of less than or equal to 0.01 Hz.

35. The signal generator of claim 33 wherein said signal generator is capable of generating its own tones, including tones made up of multiple tone portions by durations, frequencies, amplitudes and wave patterns.

36. The signal generator of claim 33 wherein said signal generator is capable of allowing the amplitude of each channel to be programmed directly.

37. The signal generator of claim 33 wherein said signal generator has the ability to communicate with the radio transceivers and change radio channels.

38. The signal generator of claim 33 wherein the signal generator has the ability to provide dual tones, without requiring sequential tones to provide such dual tones.

39. The signal generator of claim 33 further including a network interface, and wherein said signal generator is capable of receiving instructions through said network interface from a geographically remote user interface, in addition to a local interface.

40. A signal generator configured to generate tone out signals broadcast over radio transceivers and antennas, and allows for programing of new tones by an operator without requiring changes in hardware components or electrical circuitry, said signal generator comprising:

a microprocessor module;

a multi-channel synthesis core and frequency generator, capable of concurrently generating multiple audible signals from 0.001 Hz to 20 Khz forming audible tone out tones having specified frequencies, amplitude and wave shape, in communication with said microprocessor module;

a radio interface control logic in communication with said microprocessor module;

a real-time clock; and a network interface, and wherein said signal generator is capable of receiving instructions through said network interface from a geographically remote user interface, in addition to a local interface.

* * * * *